United States Patent
Levisse et al.

(10) Patent No.: US 12,078,072 B2
(45) Date of Patent: Sep. 3, 2024

(54) TURBOMACHINE MODULE PROVIDED WITH A PROPELLER AND OFFSET STATOR VANES

(71) Applicant: SAFRAN AIRCRAFT ENGINES, Paris (FR)

(72) Inventors: Paul Ghislain Albert Levisse, Moissy-Cramayel (FR); Olivier Belmonte, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 18/246,554

(22) PCT Filed: Sep. 29, 2021

(86) PCT No.: PCT/FR2021/051682
§ 371 (c)(1),
(2) Date: Mar. 24, 2023

(87) PCT Pub. No.: WO2022/069835
PCT Pub. Date: Apr. 7, 2022

(65) Prior Publication Data
US 2023/0366325 A1   Nov. 16, 2023

(30) Foreign Application Priority Data
Sep. 29, 2020 (FR) ...................... 2009933

(51) Int. Cl.
*F01D 17/16* (2006.01)
*F01D 9/04* (2006.01)
*F01D 25/24* (2006.01)

(52) U.S. Cl.
CPC .......... *F01D 17/162* (2013.01); *F01D 9/042* (2013.01); *F01D 25/246* (2013.01); *F05D 2240/12* (2013.01)

(58) Field of Classification Search
CPC ...... F01D 17/162; F01D 25/24; F01D 25/243; F01D 25/246; F01D 9/042; F04D 19/026;
(Continued)

(56) References Cited

U.S. PATENT DOCUMENTS

| 8,943,796 B2 | 2/2015 | McCaffrey |
| 2005/0008486 A1* | 1/2005 | Malmborg ............ F01D 25/246 415/209.4 |

(Continued)

FOREIGN PATENT DOCUMENTS

FR    3 055 000 A1    2/2018

OTHER PUBLICATIONS

International Search Report mailed Jan. 24, 2022, issued in corresponding International Application No. PCT/FR2021/051682, filed Sep. 29, 2021, 5 pages.
(Continued)

*Primary Examiner* — David E Sosnowski
*Assistant Examiner* — Maxime M Adjagbe
(74) *Attorney, Agent, or Firm* — Christensen O'Connor Johnson Kindness PLLC

(57) ABSTRACT

A turbomachine module having a longitudinal axis, having a shroudless propeller which is rotated about the longitudinal axis by a drive shaft, which is connected at least to a compressor rotor, and at least one distributor comprising a plurality of stator vanes which extend along a radial axis which is perpendicular to the longitudinal axis Z from a fixed casing, the distributor being arranged downstream of the propeller. The fixed casing can be an inter-compressor casing which is arranged downstream of a low-pressure compressor, along the longitudinal axis, the inter-compressor casing having a ring which has a longitudinal axis and
(Continued)

which is provided with sleeves intended to support the stator vanes, the inter-compressor casing and the ring being monobloc.

15 Claims, 2 Drawing Sheets

(58) Field of Classification Search
CPC ...... F04D 19/002; F04D 19/007; F04D 19/34; B64C 11/04; B64C 11/06; F05D 2220/3218; F05D 2220/324; F05D 2220/325
See application file for complete search history.

(56) References Cited

U.S. PATENT DOCUMENTS

| | | | |
|---|---|---|---|
| 2010/0206982 A1* | 8/2010 | Moore | F02K 3/025 |
| | | | 415/60 |
| 2017/0102006 A1* | 4/2017 | Miller | F04D 29/563 |
| 2017/0107914 A1* | 4/2017 | Lu | F02K 3/04 |
| 2018/0105278 A1 | 4/2018 | El Ghannam et al. | |
| 2018/0230831 A1* | 8/2018 | Kush | F01D 5/34 |
| 2018/0334915 A1* | 11/2018 | Bordoni | B64C 11/385 |
| 2020/0088045 A1* | 3/2020 | Simonds | F01D 17/162 |

OTHER PUBLICATIONS

Written Opinion mailed Jan. 24, 2022, issued in corresponding International Application No. PCT/FR2021/051682, filed Sep. 29, 2021, 8 pages.

* cited by examiner

TURBOMACHINE MODULE PROVIDED WITH A PROPELLER AND OFFSET STATOR VANES

CROSS-REFERENCE TO RELATED APPLICATIONS

This application is a National Stage of International Application No. PCT/FR2021/051682, filed Sep. 29, 2021, which claims priority to French Patent Application No. 2009933, filed Sep. 29, 2020, the entire disclosures of which are hereby incorporated by reference in their entirety for all purposes.

FIELD OF THE INVENTION

The present invention relates to the field of the turbomachines and in particular to a turbomachine module comprising an un-ducted propeller and a stator vane with variable pitch. It also applies to the corresponding turbomachine.

TECHNICAL BACKGROUND

The technical background is illustrated in the document US-A1-2018105278.

Turbomachines comprising at least one un-ducted propeller are known as "open rotor" or "un-ducted fan". In this category of turbomachine, there are those with two un-ducted and counter-rotating propellers (known as UDF for "Unducted Dual Fan") or those with a single un-ducted propeller and a straightener comprising several stator vanes (known as USF for "Unducted Single Fan"). The propeller or the propellers forming the propulsion portion may be placed at the rear of the gas generator (or engine) so as to be of the pusher type or at the front of the gas generator so as to be of the puller type. These turbomachines are turboprop engines that differ from turbojet engines by the use of a propeller outside the nacelle (un-ducted) instead of an internal fan. This allows to increase the bypass ratio very significantly without being penalized by the mass of the casings or nacelles intended to surround the blades of the propeller or fan.

At present, this type of turbomachine, and in particular the USF turbomachines, generates quite a lot of noise. This noise is caused by the gas generator but mainly by the interaction of the wake and the vortex generated by the winding of the current lines at the summit of the vanes of the propeller and the vanes of the straightener. This noise is louder the closer the stator vanes are to the vanes of the propellers. Indeed, the stator vanes of the turbomachines are generally installed on an inlet casing which carries the splitter nose of the primary and secondary flows circulating respectively in a primary duct and around the inlet casing. In the case of turbofans with a fan, although the stator vanes are close to the vanes of the fan to limit the impact of the elongation of the fairing of the fan and its drag, the fairing of the latter allows the installation of acoustic panels to reduce noise.

SUMMARY OF THE INVENTION

The objective of the present invention is to provide a turbomachine module with stator vanes arranged so as to reduce the acoustic impact of the un-ducted turbomachines while avoiding significant structural modifications.

This is achieved in accordance with the invention by means of a turbomachine module with a longitudinal axis X, comprising an un-ducted propeller driven in rotation about the longitudinal axis X by a power shaft which is connected to at least one compressor rotor and at least one straightener comprising a plurality of stator vanes extending along a radial axis Z perpendicular to the longitudinal axis X from a stationary casing, the straightener being disposed downstream of the propeller, the stationary casing being an inter-compressor casing arranged downstream of a low-pressure compressor, along the longitudinal axis, the inter-compressor casing comprising an annulus of longitudinal axis provided with sleeves intended to carry the stator vanes, the inter-compressor casing and the annulus being monobloc.

Thus, this solution allows to achieve the above-mentioned objective. In particular, by installing the stator vanes of the straightener on the inter-compressor casing, the distance between the vanes of the propeller and the stator vanes is extended, which allows to reduce noise. The fact that the stator vanes are offset or axially shifted also allows the centre of gravity of the turbomachine to be displaced, which rebalances the assembly and favours the recovery of forces. Indeed, a ring gear of straightener vanes weighs about 200 kg. The centre of gravity is closer to the hooking system on the aircraft. Such a configuration also allows to free up space in this constrained environment for the installation of other members or elements.

The module also comprises one or more of the following characteristics, taken alone or in combination:
- an internal casing and an inlet casing at least partly delimit a primary duct in which circulates a primary airflow.
- the inter-compressor casing comprises a radially internal shell and a radially external shell which are coaxial with the longitudinal axis X and between which at least one radial structural arm extends.
- the inter-compressor casing comprises a radial, annular wall extending radially from a first flank of the annulus and which is connected to the radially external shell of the inter-compressor casing.
- the stator vanes are of variable pitch and the module comprises a pitch change system for changing the pitches of the blades of the stator vanes.
- the stator vanes of the straightener are un-ducted.
- at least one rotational guide bearing of a stator vane root is housed in an internal housing of a sleeve.
- the stator vanes are evenly distributed around the longitudinal axis X and extend radially into a secondary air flow.
- the inter-compressor casing is produced by an additive manufacturing method.
- the inter-compressor casing and the annulus are integrally made.
- the inter-compressor casing and the annulus are assembled together by welding.
- the ratio S/C corresponding to the distance S between a trailing edge of the vanes of the propeller and a leading edge of a stator vane on the chord C of the vanes of the propeller is 3.
- the pitch change system comprises at least one control means comprising a stationary body and a body movable axially relative to the stationary body, and a connection mechanism connecting each stator vane to the movable body of the control means.
- the control means of the pitch change system is installed in the inlet casing between a splitter nose for separating the inlet flow of the turbomachine into a primary flow and a secondary flow and the inter-compressor casing.

the control means of the pitch change system is installed in the inlet casing and upstream of the inter-compressor casing.

the control means of the pitch change system is installed in an inter-duct casing extending downstream from an inlet casing carrying a splitter nose intended to separate the inlet flow entering the turbomachine into a primary flow and a secondary flow, the control means being downstream of the sleeves and downstream of a radial wall of the inter-compressor casing which connects the annulus to the radially external shell.

the control means is intended to be located radially above a high-pressure compressor.

The invention further relates to an aircraft turbomachine comprising at least one module as mentioned above and a gas generator for driving the un-ducted propeller in rotation.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which.

DETAILED DESCRIPTION OF THE INVENTION

Figure 1:
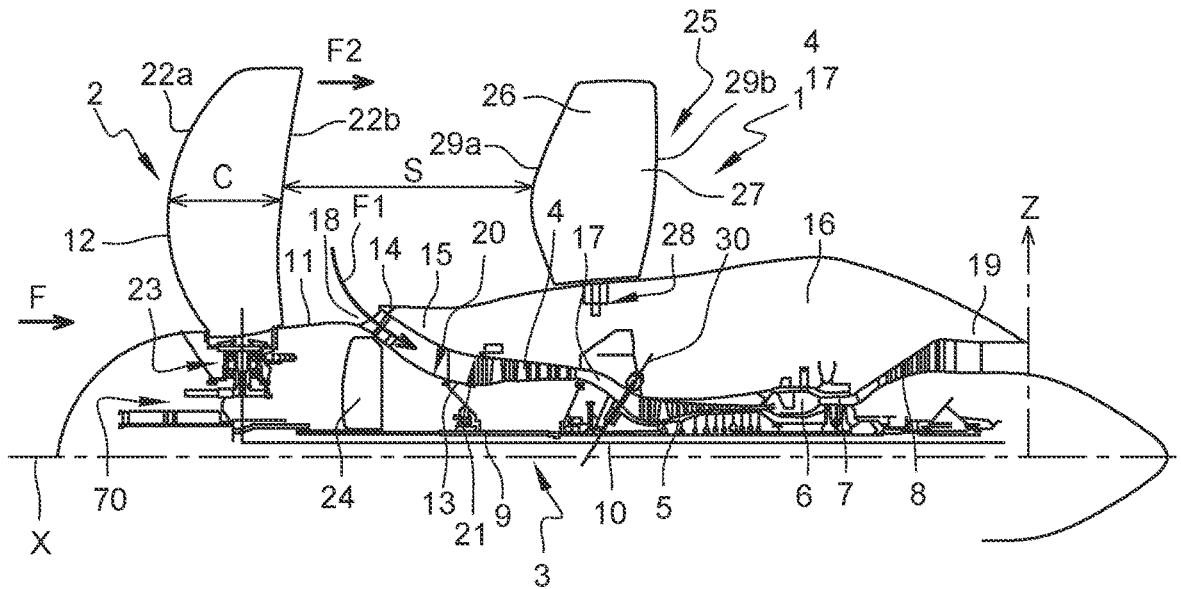
FIG. 1 is a schematic view, in axial and partial cross-section, of an example of turbomachine with a single un-ducted propeller to which the invention applies.

The invention applies to a turbomachine 1 comprising an un-ducted propeller 2 for mounting on an aircraft. Such a turbomachine is a turboprop engine as shown in FIG. 1. This turbomachine is known as "open rotor" or "un-ducted fan" as explained above.

In the present invention, and in general, the terms "upstream", "downstream", "axial" and "axially" are defined in relation to the flow of the gases in the turbomachine and here along the longitudinal axis X (and even from left to right in FIG. 1). Similarly, the terms "radial", "internal" and "external" are defined with respect to a radial axis Z perpendicular to the longitudinal axis X and with respect to the distance from the longitudinal axis X. Furthermore, the identical or substantially identical elements and/or with the same functions are represented by the same numerical references.

To facilitate its manufacture and its assembling, a turbomachine is generally modular, i.e. it comprises several modules that are manufactured independently of each other and then assembled together. The modularity of a turbomachine also facilitates its maintenance. In the present application, "turbomachine module" means a module which comprises, in particular, a fan and its power shaft for driving the propeller.

The turbomachine 1 comprises a gas generator or engine 3 which typically comprises, from upstream to downstream, a low-pressure compressor 4, a high-pressure compressor 5, a combustion chamber 6, a high-pressure turbine 7 and a low-pressure turbine 8. The low-pressure compressor 4 and the low-pressure turbine 8 are mechanically connected by a low-pressure shaft 9 so as to form a low-pressure body. The high-pressure compressor 5 and the high-pressure turbine 7 are mechanically connected by a high-pressure shaft 10 so as to form a high-pressure body. The high-pressure shaft 10 extends inside the low-pressure shaft 9 and are coaxial.

In another configuration not shown, the low-pressure body comprises the low-pressure compressor which is connected to an intermediate pressure turbine. A free power turbine is mounted downstream of the intermediate pressure turbine and is connected to the propeller described below via a power transmission shaft to drive it in rotation.

The turbomachine comprises a rotating casing 11 centred on the longitudinal axis X and rotating about the longitudinal axis X. The rotating casing 11 carries a ring gear of movable blades 12 forming the un-ducted propeller 2. The rotating casing 11 is movably mounted with respect to an internal casing 13 which extends downstream of the rotating casing 11. In the example shown in FIG. 1, the propeller 2 is mounted upstream of the gas generator 3 (puller configuration).

The air flow F entering the turbomachine passes through the blades 12 of the propeller and is separated by a splitter nose 14 so as to form a primary air flow F1 and a secondary air flow F2. The splitter nose 14 is supported by an inlet casing 15 centred on the longitudinal axis. The inlet casing 15 is extended downstream by an external casing or inter-duct casing 16. The inlet casing 15 is coaxial with the internal casing 13. Furthermore, the inlet casing 15 extends radially outwards from the internal casing 13.

The primary air flow F1 circulates in a primary duct 17 through the gas generator 3. In particular, the primary air flow F1 enters the gas generator 3 through an annular air inlet 18 and exits through a primary nozzle 19 which is disposed downstream of the gas generator 3. The primary duct 17 is radially delimited by a radially internal wall 20 and a radially external wall 21. The radially internal wall 20 is carried by the internal casing 13. The radially external wall 21 is carried at least partly by the inlet casing 15. As for the secondary flow F2, it circulates around the inlet casing 15.

Each blade 12 of the propeller 2 comprises an axially opposed leading edge 22a and trailing edge 22b. The blades also comprise a root 23 from which they extend radially outwards.

The power shaft or low-pressure shaft 9 (of the free power turbine and the low-pressure turbine respectively) drives the propeller 2 by means of a reducer 24 which compresses the air outside the rotating and inlet casings 11, 15 and provides most of the thrust. The reducer 24 can be of the planetary gear train or epicyclic gear train type.

As can be seen in FIG. 1, the turbomachine 1 comprises a straightener 25 comprising a plurality of stator vanes 26 (or stationary vanes) known by the acronym "OGV" for Outlet Guide Vane. The stator vanes 26 are evenly distributed about the longitudinal axis X and extend radially into the secondary air flow. There are between six and eight stator vanes 26 around the inlet and inter-duct casings. Of course, there may be a greater number of stator vanes around the longitudinal axis X. It may have between six and fourteen stator vanes 26 distributed around the longitudinal axis. The stator vanes 26 of the straightener 25 are disposed downstream of the propeller 2 so as to straighten the air flow generated by the propeller 2. Each stator vane 26 comprises a blade 27 extending radially from a root 28. It is understood, as also shown in FIG. 1, that the stator vanes 26 of the straightener are un-ducted. The turbomachine shown is a USF, there is no fairing of the propeller and of the straightener. The blades 27 also comprise an axially opposed leading edge 29a and trailing edge 29b. The stator vanes 26 also extend radially outwards from the inter-duct casing.

The stator vanes 26 are mounted on a stationary casing of the turbomachine. In particular, the stator vanes 26 are mounted on an inter-compressor casing 30 which forms the stationary casing. The inter-compressor casing 30 is arranged downstream of the low-pressure compressor 4. More specifically, the inter-compressor casing 30 extends axially between the low-pressure compressor 4 and the high-pressure compressor 5.

Figure 2:
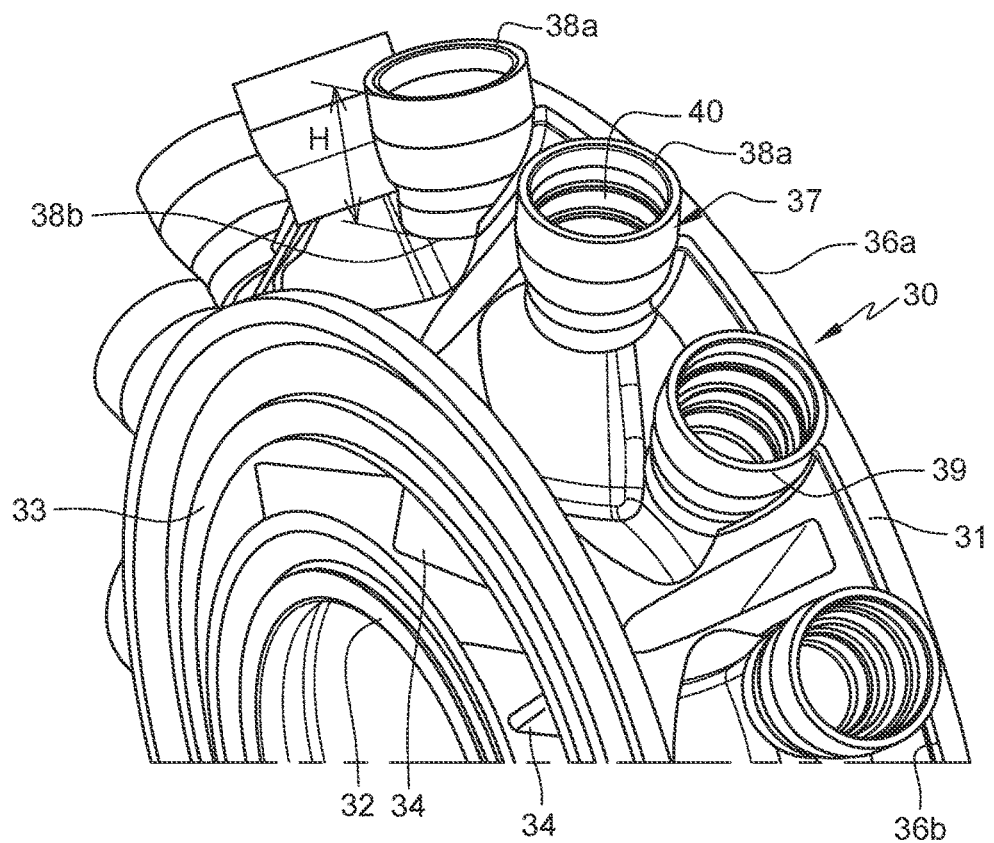
FIG. 2 is a perspective view of an inter-compressor casing intended to carry stator vanes.

With reference to FIG. 2, the stator vanes 26 are carried by an annulus 31 with a longitudinal axis X. In the case of a circular annulus, the longitudinal axis X is the axis of revolution of the annulus. In the case of a polygonal annulus, the longitudinal axis is the centre of the polygon. The annulus 31 is monobloc with the inter-compressor casing 30. In particular, the annulus 31 and the inter-compressor casing 30 are integrally made integral (in one piece). Alternatively, the annulus and the inter-compressor casing are manufactured separately (e.g. by casting or several welded castings) and then assembled together by welding.

Advantageously, in the case of the inter-compressor casing 30 integral with the annulus 31, the inter-compressor casing 30 (as well as the annulus 31) is produced by an additive manufacturing method.

In FIG. 2, the inter-compressor casing 30 comprises a radially internal shell 32 and a radially external shell 33 which are centred on the longitudinal axis X. Between the radially internal ferrule 32 and the radially external shell 33 there extends radially at least one structural radial arm 34. Specifically, a number of radial arms 34 are attached to the radially internal and external shells 32, 33. The radial arms 34 are also evenly distributed around the longitudinal axis X. They are between 6 and 10 radial arms so as to optimise the mechanical strength of the inter-compressor casing 30. These arms 34 are stationary and are made integral with the internal and external shells 32, 33. The number of stator vanes 26 (e.g. between 6 and 10) facilitates their integration on the inter-compressor casing 30.

The radially internal shell 32 and the radially external shell 33 constitute segments of the radially internal and external walls 20, 21 of the primary duct 17. The primary flow passes through the radial arms 34.

The annulus 31 extends radially outwards from the radially external shell 33. A radial wall 35 (see FIGS. 3 and 4) extending radially from a first flank 36a of the annulus 31 is connected to the radially external shell 33 of the inter-compressor casing 30. The wall 35 is annular, centred on the axis X, and advantageously solid. This wall 35 is defined substantially in a plane P (FIG. 3) perpendicular to the longitudinal axis X. This plane P may be slightly inclined from the radial axis Z by about 10°. The annulus 31 comprises a plurality of cylindrical sleeves 37 which extend radially outwards. The base of each sleeve 37 is circular.

Figure 3:
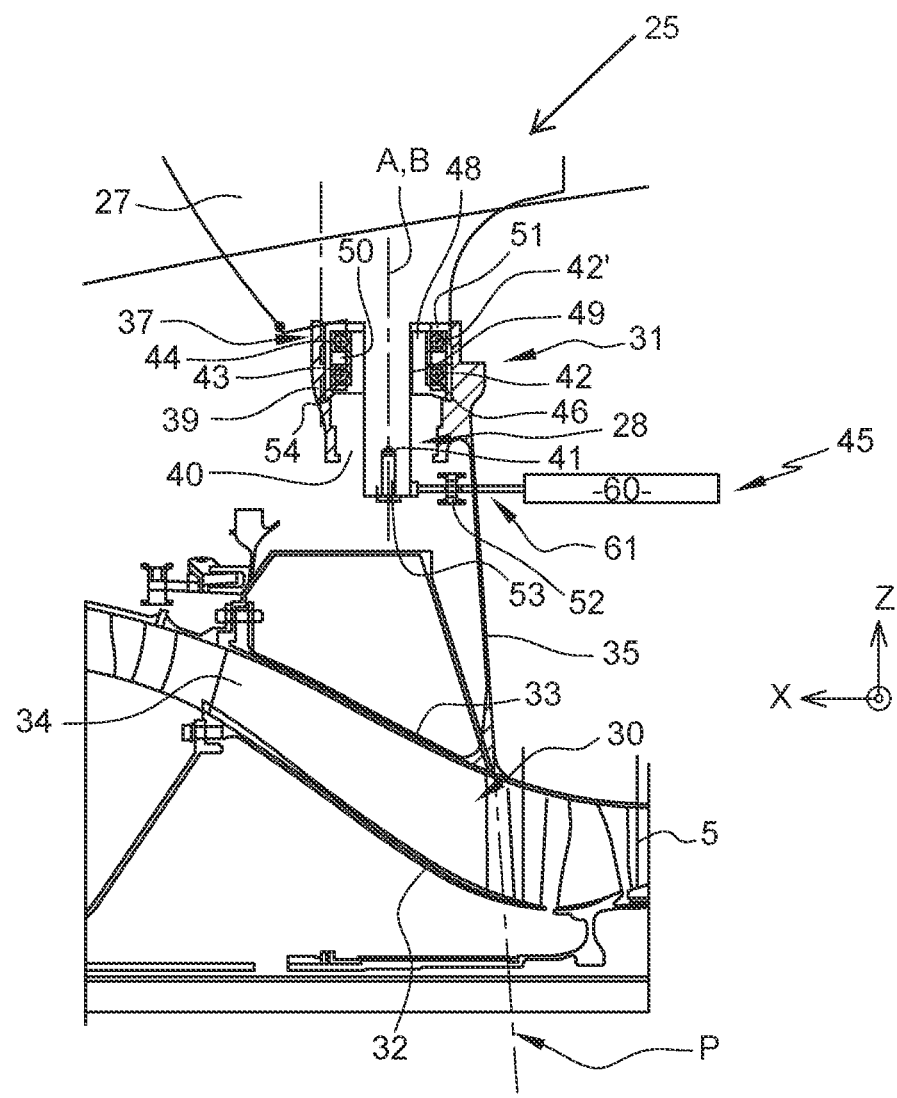
FIG. 3 shows a perspective view of a pitch change system for changing the pitch of the blades of the stator vanes of a turbomachine with a single un-ducted propeller to which the invention applies.

With reference to FIGS. 2 and 3, the sleeves 37 are evenly distributed around the longitudinal axis X. In particular, the sleeves 37 extend axially from a second flank 36b of the annulus 31. The second flank 36b (see FIG. 2) is axially opposite the first flank 36a. Advantageously, but not restrictively, the second flank 36b is approximately two-thirds of the radial height H of each sleeve 37 measured between a first border 38a of the sleeve 37 and a second border 38b of the sleeve 37. Each sleeve 37 comprises a cylindrical skirt 39 with axis A parallel to the radial axis Z. The cylindrical skirt 39 is delimited by the first and second borders 38a, 38b. The axis A of the sleeves 37 is defined in a radial plane which is axially offset from the plane P of the radial wall 35. The sleeves 37 are advantageously placed radially above (and considering FIGS. 2 and 3) the structural radial arms 34, thus allowing to enhance the mechanical strength of the sleeves 37.

Each sleeve 37 comprises a bore 40 which passes through the cylindrical skirt 39 on either side along the axis. The bore 40 forms an internal housing for receiving the root of a stator vane 26.

With such a configuration, the ratio S/C corresponding to the distance S between the trailing edge 22b of the vanes of the propeller 2 and of the leading edge 29a of the stator vanes 26 on the chord C of the vanes of the propeller 2 is improved. This ratio S/C is of the order of 3, whereas in the prior art this ratio is between 1 and 2. The minimum ratio for compliance with noise standards is 1.

With reference to FIG. 3, the stator vanes 26 are advantageously variable in pitch setting so as to optimise the performance of the turbomachine. For this purpose, the turbomachine 1 comprises a pitch change system 45 for changing the pitch of the blades of the stator vanes 26. We can see that the root 28 of each vane 26 is typically in the form of a pivot 41 which is pivotally mounted along an axis B in an internal housing. The axes A and B are coaxial. The pivot 41 of the root is pivotally mounted by means of at least one guide bearing 42 in the internal housing of each sleeve 37. In the present example, two guide bearings 42, 42' are superimposed along the radial axis Z. These bearings 42, 42 are preferably, but not restrictively, rolling bearings. The bearings may be larger in diameter than usual due to the space available in the sleeves 37 and the location of the inter-compressor casing 30.

Each bearing 42, 42' comprises an internal ring 43 secured in rotation to the pivot and an external ring 44 that surrounds the internal ring 42. The rollings comprise rolling members 46 which are installed between the internal surfaces of the internal and external rings which form raceways. The rolling members 46 here comprise balls. The bearings 42, 42' advantageously ensure that the vanes 26 are retained in the housing of the sleeves 37.

A cylindrical socket 48 is fitted in each bore 40 so as to connect the internal ring 43 of each bearing 42, 42' to the root of each stator vane 26. The socket 48 is centred on the pitch axis B of the stator vanes. Each socket 48 extends between a first end and a second end. Each socket 48 is also provided with internal splines 49 arranged on an internal cylindrical face. The internal splines 49 are intended to mate with external splines provided on an external surface of the pivot 41 of each root of a stator vane 26. Between each bearing 42, 42' a spacer 50 extends along the radial axis Z to ensure the spacing between the bearings 42, 42', as these must absorb the forces and moments. Consequently, two bearings are needed at intervals to ensure that the bending moment can be absorbed. This spacer 50 is advantageously, but not restrictively, placed between two internal rings of the bearings 42, 42'. Sealing elements are provided in each bore 40 so as to prevent the leakage of lubricant from the bearings to the outside. As can also be seen in FIG. 3, two hoops are arranged between the internal wall of each sleeve 37 and the lateral flanks of the bearings 42, 42'. A first hoop 51 has an L-shaped axial cross-section with a branch that radially overlaps the (radially upper) bearing 42', and a second hoop 54 has an I-shaped axial cross-section (in capital letter) with an axial bulge. The (radially lower) bearing 42 is supported on the axial bulge. Advantageously, the first and second hoops are each annular in shape and nest into each other. The hoops 51, 54 allow to provide a radial blocking of the bearings 42, 42'.

The pitch change system 45 comprises at least one control means 60 (shown schematically) and at least one connection mechanism 61 (shown schematically) connecting each stator vane 26 to the control means 60.

The pivot 41 of each blade root 27 comprises an arm 52 forming an eccentric at its lower free end. Advantageously, but not restrictively, the pivot 41 comprises a radial bore which opens at the level of the free end thereof. An attachment member 53 such as a screw is received in the radial bore to attach the arm 52 to the root of the stator vane 26. In the example shown, there are as many arms as there are stator vanes 26. The arm 52 is connected to a first end of a link which forms the connection mechanism 61. The first end of the link is provided with a ball joint through which passes an articulation axle carried by the arm 52. The articulation axle axis is parallel to the radial axis Z. The second end of the link (opposite the first end) is connected to the control means 60.

The control means 60 is advantageously an actuator such as a hydraulic jack. The actuator comprises a stationary body and a body movable with respect to the first stationary body. The first stationary body is connected to a stationary shell of the turbomachine so as to be immovable in translation and in rotation. In particular, the stationary shell is mounted on the stationary inter-duct casing. The movable body displaces in translation axially with respect to the stationary body along the longitudinal axis X. The movable body comprises an axial rod, the free end of which is connected to the second end of the link. The actuator is connected to a fluid supply source to supply pressurised oil to chambers (not shown) of the stationary body.

Advantageously, the pitch change system 45 is arranged in an annular space defined in the inter-duct casing 16.

In FIG. 3, the control means, in this case the hydraulic cylinder, is mounted downstream of the inter-compressor casing 30 and in an area known as the "core area". This "core area" is located near the combustion chamber 6. There is more space in this area to install the pitch change system 45 as well as auxiliaries for the oil supply of the pitch change system, for the electrical power supply for the de-icing of the splitter nose 14, for the pressurisation air, etc. In addition, the core area is a fire area. As the hydraulic jack is generally a fuel-operated jack, the jack can be kept within the fire area defined by the core area (and limited by the wall 35 of the inter-compressor casing 30). In particular, the control means is located downstream of the wall 35. More specifically, the control means is housed above the high-pressure compressor 5.

Figure 4:
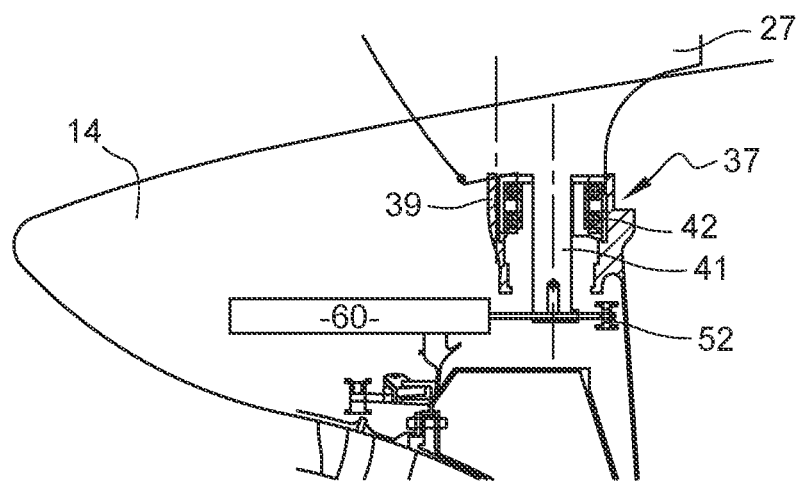
FIG. 4 illustrates in axial and partial cross-section a further embodiment of a turbomachine stator vane root mounted in an inter-compressor casing and cooperating with a pitch change system according to the invention.

FIG. 4 illustrates a further embodiment of the pitch change system arrangement 45. The control means 60 is arranged between the splitter nose 14 and the inter-compressor casing 30. In this case, the control means 60 is installed in the vicinity of the splitter nose 14. It is arranged upstream of the inter-compressor casing 30. The control means is installed in particular upstream of the roots 28 of the stator vanes 26.

With reference to FIG. 1, the turbomachine module may comprise a further pitch change system 70 for changing the pitch of the movable blades of the propeller 2. This pitch change system 70 is arranged upstream of the gas generator 3 and radially below the roots of the movable blades of the propeller 2. This pitch change system comprises a second control means comprising a body movable axially with respect to a stationary body mounted on a stationary structure secured to the internal casing 13. The pitch change system also comprises at least one load transfer bearing comprising an internal ring connected to the movable body and an external ring, and a second connection mechanism for connecting the external ring to the movable blades 12 of the propeller 2. The pitch change system for changing the pitch of the blades allows to vary the pitch of the blades 12 around their pitch axes so that they occupy different angular positions depending on the operating conditions of the turbomachine and the phases of flight concerned, such as an extreme working position (reverse thrust position) and an extreme feathering position of the blades. The control means is also a hydraulic jack comprising the stationary body and the movable body. The connection mechanism here comprises connecting rods.

The invention claimed is:

1. A turbomachine module with a longitudinal axis, comprising:
   an un-ducted propeller driven in rotation about the longitudinal axis by a power shaft which is connected to at least one compressor rotor, and at least one straightener comprising a plurality of stator vanes extending along a radial axis perpendicular to the longitudinal axis from a stationary casing, the at least one straightener being disposed downstream of the propeller,
   wherein the stationary casing is an inter-compressor casing arranged downstream of a low-pressure compressor, along the longitudinal axis,
   wherein the inter-compressor casing comprises an annulus centered on the longitudinal axis provided with sleeves configured to carry the plurality of stator vanes, and
   wherein the inter-compressor casing and the annulus are monobloc.

2. The turbomachine module of claim 1, wherein the inter-compressor casing comprises a radially internal shell and a radially external shell which are coaxial with the longitudinal axis and between which at least one radial structural arm extends.

3. The turbomachine module of claim 1, wherein the plurality of stator vanes are of variable pitch and wherein the module further comprises a pitch change system for changing the pitches of the blades of the plurality of stator vanes.

4. The turbomachine module of claim 1, wherein at least one rotational guide bearing of a stator vane root is housed in an internal housing of one of the sleeves.

5. The turbomachine module of claim 1, wherein the plurality of stator vanes are evenly distributed around the longitudinal axis and extend radially into a secondary air flow.

6. The turbomachine module of claim 1, wherein the inter-compressor casing is made by an additive manufacturing method.

7. The turbomachine module of claim 1, wherein the inter-compressor casing and the annulus are integrally made.

8. The turbomachine module of claim 1, wherein the inter-compressor casing and the annulus are assembled together by welding.

9. The turbomachine module of claim 1, wherein the propeller includes vanes and wherein a ratio S/C corresponds to a distance S between a trailing edge of the vanes of the propeller and a leading edge of a stator vane on a chord C of the vanes of the propeller, and wherein the ratio S/C is 3.

10. The turbomachine module of claim 3, wherein the pitch change system comprises at least one control means comprising a stationary body and a body movable axially with respect to the stationary body, and a connection mechanism connecting each stator vane to the movable body of the at least one control means.

11. The turbomachine module of claim 10, wherein the control means of the pitch change system is installed in an inlet casing and upstream of the inter-compressor casing.

12. The turbomachine module of claim 2, wherein a control means of the pitch change system is installed in an inter-duct casing extending downstream from an inlet casing carrying a splitter nose intended to separate the flow entering the turbomachine into a primary flow and a secondary flow, the control means being downstream of the sleeves and downstream of a radial wall of the inter-compressor casing which connects the annulus to the radially external shell.

13. The turbomachine module of claim 1, wherein the plurality of stator vanes of the straightener are un-ducted.

14. An aircraft turbomachine comprising at least one module according to claim 1 and a gas generator for driving the un-ducted propeller in rotation.

15. The turbomachine module of claim 10, wherein the control means of the pitch change system is installed in an inter-duct casing extending downstream from an inlet casing carrying a splitter nose intended to separate the flow entering the turbomachine into a primary flow and the secondary flow, the control means being downstream of the sleeves and downstream of a radial wall of the inter-compressor casing which connects the annulus to a radially external shell.

* * * * *